United States Patent
Chou et al.

(10) Patent No.: US 7,180,916 B2
(45) Date of Patent: Feb. 20, 2007

(54) COMPENSATING FOR RANDOM ROBBED BIT SIGNALING

(75) Inventors: Shaohan J. Chou, Monmouth County, NJ (US); Jinguo Yu, Monmouth County, NJ (US); Zhenyu Wang, Monmouth County, NJ (US)

(73) Assignee: Agere Systems Inc., Allentown, PA (US)

( * ) Notice: Subject to any disclaimer, the term of this patent is extended or adjusted under 35 U.S.C. 154(b) by 1002 days.

(21) Appl. No.: 09/846,566

(22) Filed: Apr. 27, 2001

(65) Prior Publication Data

US 2002/0186722 A1    Dec. 12, 2002

(51) Int. Cl.
*H04M 1/24* (2006.01)
(52) U.S. Cl. .................................................. 370/523
(58) Field of Classification Search ............. 370/241, 370/242, 248, 252, 503, 509, 510, 512, 522–524; 379/10.01, 22.02, 22.03, 23, 26.01, 27.01, 379/27.02, 27.03, 27.04, 31
See application file for complete search history.

(56) References Cited

U.S. PATENT DOCUMENTS

| | | | |
|---|---|---|---|
| 5,862,184 A * | 1/1999 | Goldstein et al. | 375/295 |
| 5,926,505 A * | 7/1999 | Long | 375/222 |
| 5,995,558 A | 11/1999 | Betts et al. | |
| 6,018,525 A | 1/2000 | Sucharczuk | |
| 6,178,185 B1 | 1/2001 | Marks | |
| 6,185,250 B1 * | 2/2001 | Wang et al. | 375/222 |
| 6,381,266 B1 * | 4/2002 | Zhang et al. | 375/222 |
| 6,438,158 B1 * | 8/2002 | Zhou et al. | 375/222 |
| 6,721,279 B1 * | 4/2004 | Zhang et al. | 370/252 |

* cited by examiner

*Primary Examiner*—Huy D. Vu
*Assistant Examiner*—Duc Duong

(57) ABSTRACT

A method for training a receiving modem connected through a telephone network to correct for differences between a transmitted and a received symbol occasioned by network impairments including robbed bit signaling which preempts a least significant bit of a customer's data depending on the frame assigned by the network for such connection.

14 Claims, 4 Drawing Sheets

COMPENSATING FOR RANDOM ROBBED BIT SIGNALING

FIELD OF THE INVENTION

This invention relates to data communications over the public switched communications network and, more particularly, to providing for high bit rate data communication over trunks subject to robbed bit signaling.

BACKGROUND OF THE INVENTION

The extended super frame format used in the public switched telephone network (PSTN) employs 24, 8-bit symbols from which a least significant bit (LSB) is preempted ("robbed") every 6 symbols for network signaling purposes in a scheme called robbed bit signaling (RBS). The super frame format has 4 RBS frames, each RBS frame composed of 6, 8-bit symbols. According to convention, LSBs of the first RBS frame are called the 'A' bits, those from the second RBS frame are known as 'B' bits while the signaling bits in the third and fourth RBS frames are called the 'C' and 'D' bits. Between network switches RBS is used for synchronization. Each RBS super frame consists of 4 RBS frames and each frame has 6 phases.

Within the PSTN it is known which bits have been robbed for signaling and what their signaling levels are. However, this information is not known at the client site (customer's) interface to the PSTN. If it is desired to use the PSTN to transmit data, the client site interface must synchronize to the sampling rate and levels used in the digital trunks.

In the prior art, it was the practice in the network to rob the LSB only of symbols represented by an even level PCM code. This allowed the RBS pattern to always be ABDC=1111. A client site modem could therefore be trained on samples of a level that would not be subject to robbing. For example, in U.S. Pat. No. 6,178,185, a client site modem could send a test pattern composed of high-amplitude symbols to train a receiving client site modem because the training level could be at a different level than would be used for bit robbing.

More recently, however, network signaling systems are being deployed that do not always subject the same symbol level to having its LSB robbed for network signaling purposes. In random RBS, the ABCD pattern may change during the four robbed bit frames of the extended super frame. When the signaling level pattern changes it becomes necessary for the client site's modem to learn the signaling levels during the training sequence. In Wang et al, U.S. Pat. No. 6,185,250, and in a co-pending application entitled "Improved Equalizer Training In the Presence of Network Impairment", filed on Jun. 22, 1999, Ser. No. 09/338,664, arrays of slicer tables are employed to detect the levels used for network signaling. Briefly, a training sequence of analog symbols is transmitted to the client site's modem to enable the modem to construct a slicer table to learn what levels are being employed at the network. The substance of the aforementioned patents is incorporated herein by reference.

Unfortunately, when the training sequence passes through the PSTN, the network may rob a bit position of the training sequence, thereby corrupting its digitally encoded value. Moreover, in some networks, not only may the original signal be robbed by the ABCD pattern, but digital loss may be applied for network echo cancellation purposes. In addition, if the signal is passed over a subscriber line carrier system, the signal may go through another robbed bit signaling process. The final result is that bits may change value between the transmitter and the receiver, thereby injecting a serious noise component into the level learning procedure as well as slowing down the analog modem's construction of its slicer table. Since there are four RBS frames and 6 phases in each frame, detecting the robbed positions would seem to require an array of twenty-four slicers, each of which must attempt to ascertain the slicing level for its phase of the RBS super frame. This is represents a large commitment of hardware and software resources.

SUMMARY OF THE INVENTION

In accordance with the principles of the present invention, the problem of compensating for random RBS by the network is solved by using slicer tables capable of distinguishing between a high level (LSB=1) and a low level (LSB=0) for each type of symbol used in the training sequence. Typically, a 6 symbol training sequence is employed which means that there can only be twelve possible levels at which a training symbol can be received, without regard to the RBS frame in which the training sequence is sent.

BRIEF DESCRIPTION OF THE DRAWING

The foregoing and other features of the present invention may become more apparent from a reading of the ensuing description and accompanying drawing, in which.

GENERAL DESCRIPTION

Figure 1:
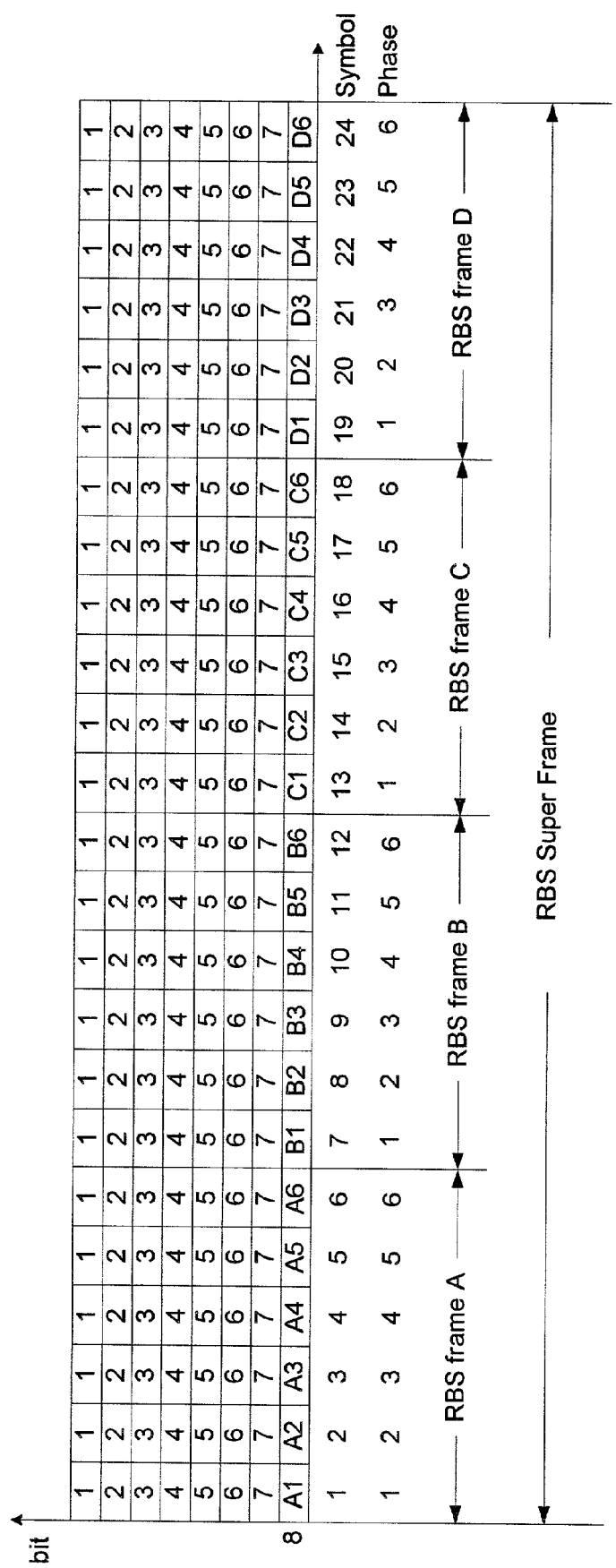
FIG. 1 depicts an extended super frame showing the six phases of each of the RBS frames and the LSB positions employed for robbed bit signaling.
Figure 2:
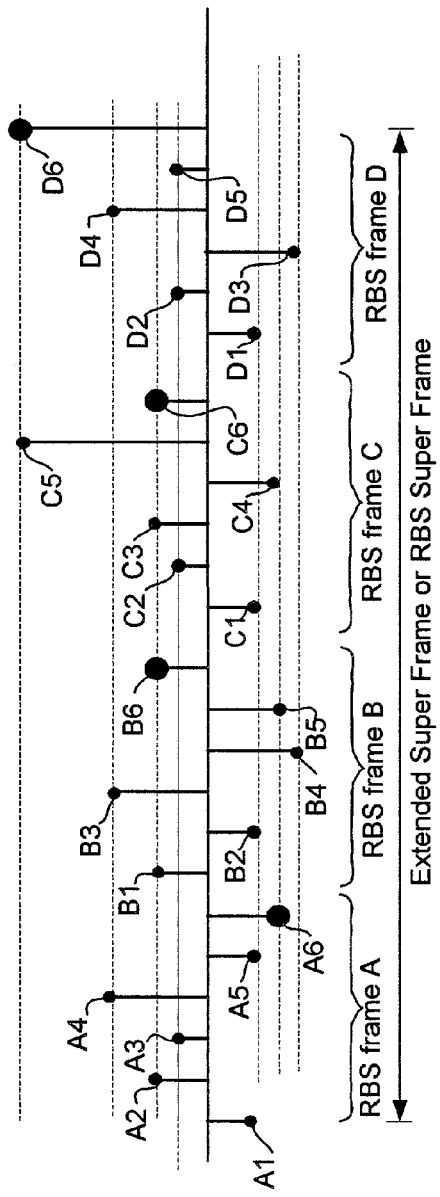
FIG. 2 shows an example of LSB bit robbing of training symbols sent during the different phases of a super frame.

Referring to FIG. 1 the twenty-four symbols of an extended super frame are shown labeled. Each super frame carries 24, 8-bit symbols and has four RBS frames: A, B, C and D, each having six phases. Table 1, below, shows how LSBs may be used between switch pairs for network synchronization during the six phases. Note that the robbed LSBs of each frame are separated by 6 phases, e.g., symbol A1 of RBS frame A is 6 phases removed from symbol B1 of RBS frame B.

(This Space Intentionally Left Blank To Accommadate Table)

TABLE 1

| Switch Pair | RBS Pattern |
| --- | --- |
| 1, 2 | A1B1C1D1 |
| 3, 4 | A2B2C2D2 |
| 5, 6 | A3B3C3D3 |
| 7, 8 | A4B4C4D4 |
| 9, 10 | A5B5C5D5 |
| 11, 12 | A6B6C6D6 |

When a customer's modem sends a training symbol at some analog level, the network encodes that level into an eight-bit PCM code. However, the network may allocate the LSB of that symbol for network signaling purposes. Moreover, with random RBS the LSB may be changed in a different way between RBS frames so that a given training symbol may be altered in a different manner depending upon the RBS frame in which it happens to be transmitted. Such changes to a training symbol, if undetected, would result in an erroneous training value being received at the customer's modem, thereby slowing down the training of the modem. Accordingly, the receiving modem should detect (a) which phase is used by the network for robbed bit signaling and (b) what the pattern of LSB robbing is among the four RBS frames of the extended RBS super frame.

In order to ascertain the specific nature of the network impairment, the aforementioned Wang U.S. Pat. No. 6,185,250 utilized a sequence of training signals. A first sequence was a constant level symbol to enable the modem to synchronize to the bit rate of the network clock. In the aforementioned Wang patent, the analog modem was provided with an individual slicer table for each LSB bit position that could be preempted by the network. Since there are twenty four such LSB positions in a super frame, twenty-four such slicer tables were thought to be required. In accordance with the principles of the present invention, however, the number of slicer tables that are required is related to the types of training symbols employed rather than the number of LSB positions in the super frame.

Figure 3:
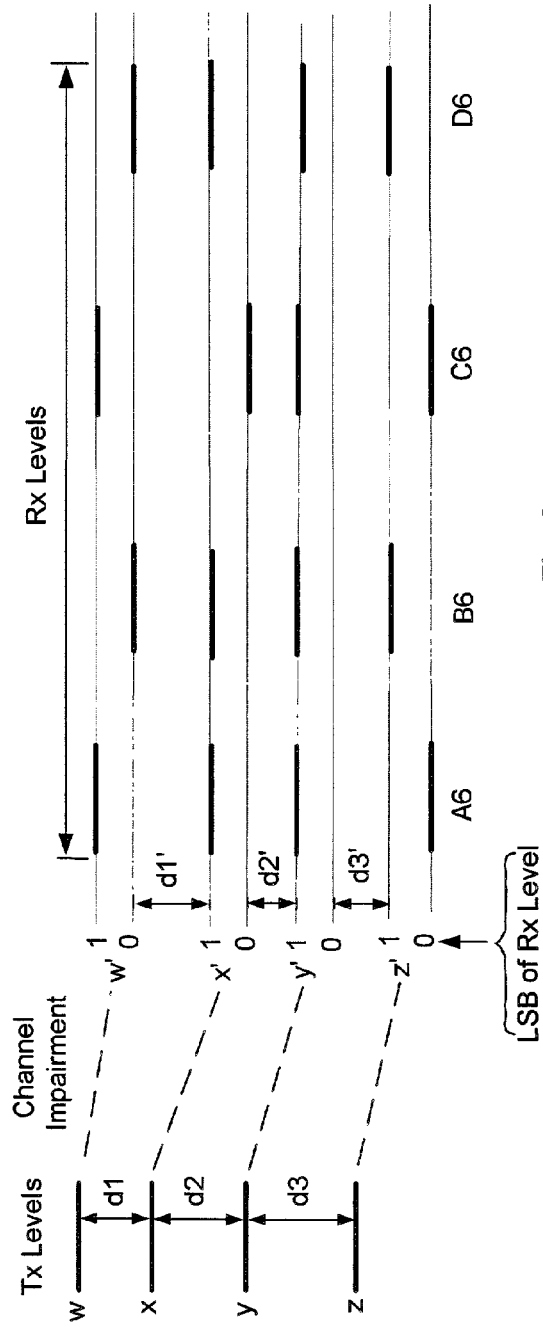
FIG. 3 shows how the number of slicers required to compensate for random RBS is related to the number of training levels rather than to the number of phases in the super frame.

A somewhat simplified example may make the point. Referring to FIG. 3, let it be assumed that the modem training sequence desires to use the four Tx levels w, x, y and z shown at the left. Because of random RBS and network impairment, the Rx levels w', x', y' and z' will differ from the Tx levels w, x, y, and z. Moreover, the Rx levels may change from one RBS frame to the next. The four columns of FIG. 3 show how the value of an Rx level may be made higher or lower due to random RBS and digital impairment by the network. Note that the distance d1 between Tx levels w and x may be different from the distance d1' between Rx levels w' and x' and also, that the distance d2' between Rx levels x' and y' may be different from the distance d2 between Tx levels x and y.

Consider the top row of FIG. 3 which shows Tx level w and Rx level w'. During RBS frame A, the LSB of level w is changed to a 1, resulting in raising the value of received symbol A6. During RBS frame B, the LSB of level w is changed to a 0 which lowers the value of received symbol B6. During RBS frame C the LSB of level w is changed to a 1 which raises the value of received symbol C6. During RBS frame D the LSB of level w is changed from a 1 to a 0 which lowers the value of received symbol D6. From this one might assume (incorrectly!) that a separate slicer will be required for each RBS frame.

Consider now row x' of FIG. 3 which shows how Tx level x may be received during the four random RBS frames. Because of the fact that there may be different amounts of noise at different levels, and also perhaps because of the digital loss applied by the network for echo cancellation purposes, the x' level may be affected differently than the w' level. Thus, in the first column of the x' level, the LSB is changed to a 1 for symbol A6 which raises the value of the received symbol. In the second column, the LSB of level x' is changed to a 1 which raises the value of symbol B6. In the third column, the LSB of level x' is changed to a 0 which lowers the value of symbol C6 and, in the fourth column, the LSB of level x is changed to a 1 which raises the value of symbol D6. Similarly, there will be different changes between the Tx and Rx levels for levels y and z, as shown in the third and fourth rows of FIG. 3.

Figure 4:
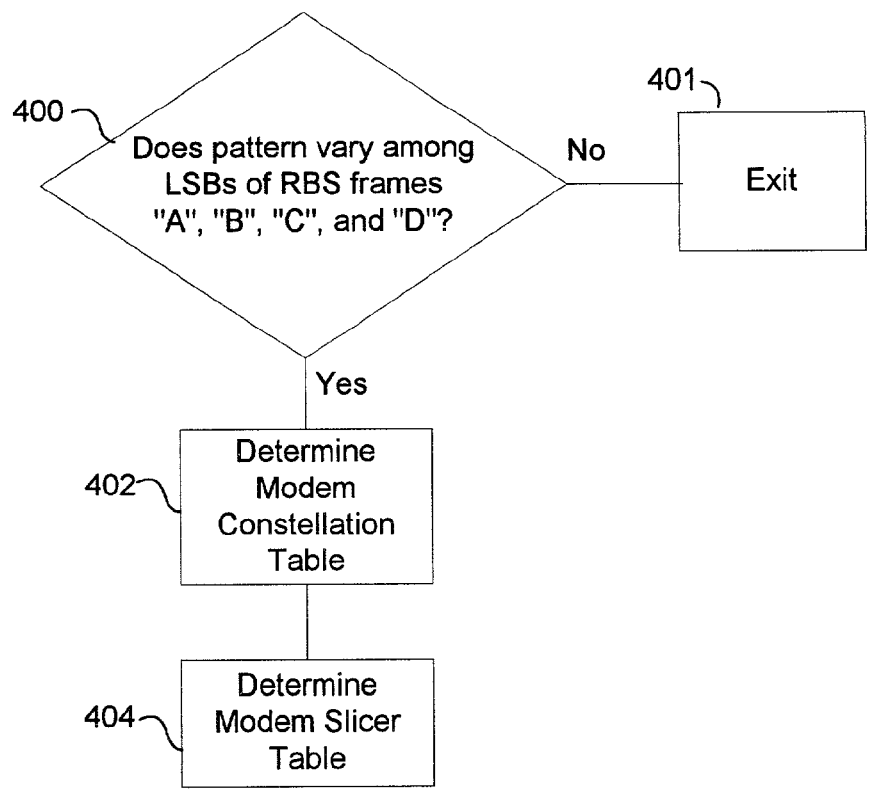
FIG. 4 is a flow chart of the three step method of our invention for coping with random RBS.

Considering all four rows of FIG. 3, it can be seen, however, that despite the random RBS phases, there are only 8 possible Rx levels that could correspond to the four Tx levels. Accordingly, only one slicer capable of distinguishing between 8 Rx levels is required despite the fact that symbols may be received in four different RBS frames. So, for example, if there were six Tx levels, each of which could be received as a higher or lower Rx level, there would only be 12 possible Rx levels throughout the random RBS phases despite the fact that symbols may be received in four different RBS frames. Accordingly, only one slicer capable of distinguishing between 12 Rx levels is required. Conversely, even if we have a type of slicer that is capable of detecting only one level, the number of slicers required is related to the number of Tx (or Rx) levels rather than to the number of symbols in a random RGS super frame. Moreover, because of the finite times between the RBS frames, these same slicers can be re-used for each of the four RBS frames. To implement this principle in an illustrative embodiment, the following three-step procedure is employed:

Referring to FIG. 4, the first step 400 is to detect whether the channel is subject to LSB variation among the random RBS phases. This is accomplished during the two-level training procedure. referred to in U.S. Pat. No. 6,185,250. Illustratively, a simple 24 symbol data buffer (not shown) can determine whether the value of the LSBs changes between the "A", "B", "C" and "D" RBS frames. If a pattern of variation is detected, random RBS is in effect and the second step 500 is performed to determine the modem constellation table, i.e., the constellation of symbol levels, shown in FIG. 5. If there is no LSB variation among the RBS phases, the inventive procedure is exited, and prior art methods of modem training may be employed. After the constellation of symbol levels is determined, the third step of the method, determines the modem slicer table.

Figure 5:
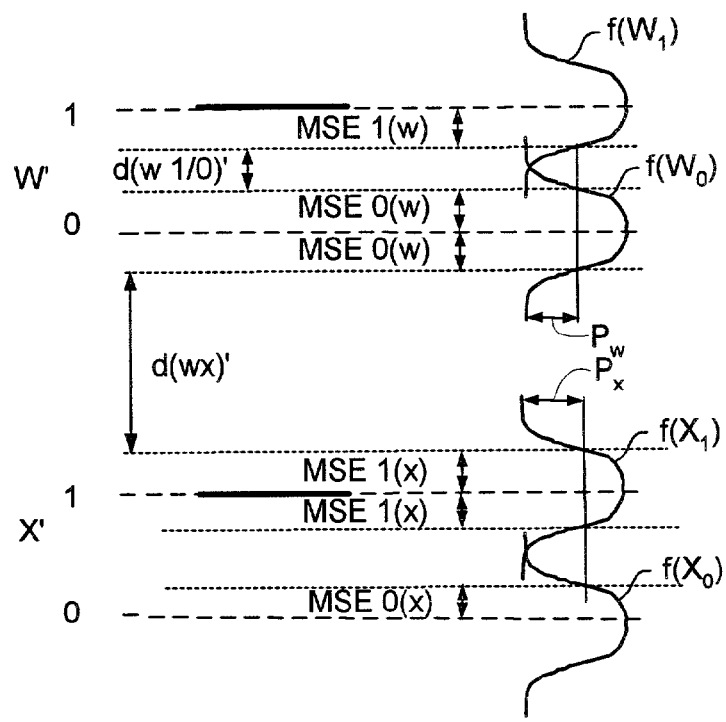
FIG. 5 shows how the constellation of modem levels is determined by the probability density function.
Figure 6:
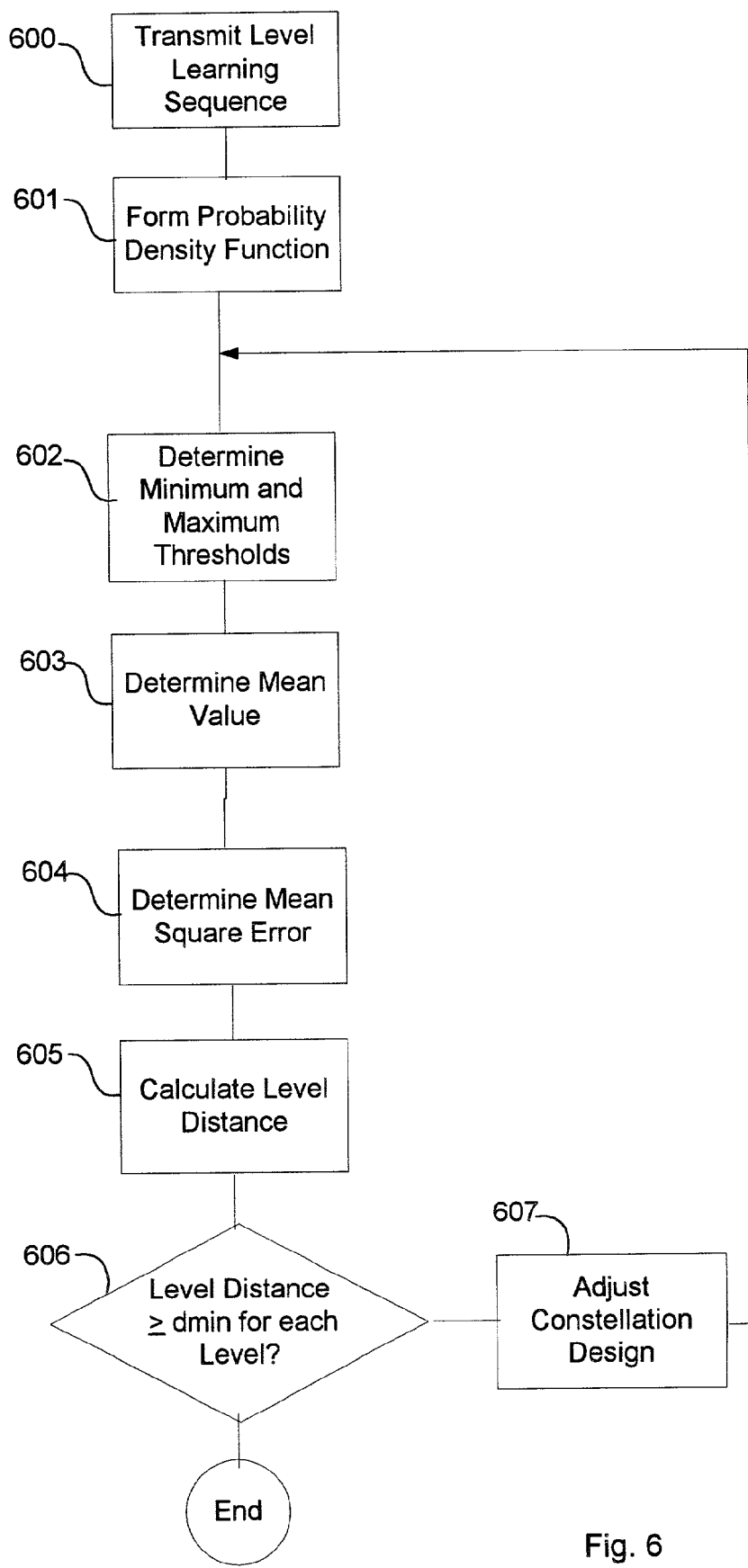
FIG. 6 is a flow chart for determining the modem constellation levels.

Referring to FIGS. 5 and 6, the "constellation" of PCM signal levels is advantageously determined using the minimum distance criteria described in co-pending application of Z. Wang 2, Ser. No. 09/324,304, filed Jun. 2, 1999. The process for generating a constellation design begins at 600 with transmitting a level learning sequence. Initially one level is sent such as level W, FIG. 5, and a probability density function characterizing that level is obtained at 601. This is followed by sending a predetermined set of PCM levels and repeating the transmission a sufficient number of times to gather statistically significant data at the receiving site modem. Generally, 100 retransmissions should suffice. At 602 a range of thresholds is defined for each possible received signal level wherein the probability of correctly receiving the transmitted message exceeds a pre-selected probability P.

Because of random RBS, as shown in FIG. 5, a transmitted level such as level W may have its LSB changed to either a 0 or a 1. The received symbol W' will therefore be characterized by two probability density functions $f(W_0)$ and $f(W_1)$, respectively. The mean value of received signal at each level is recorded at 603, FIG. 6. The mean squared error (MSE) is determined at 604 for each possible received signal level by estimating the range wherein the probability of correctly receiving a transmitted message exceeds or equals a selected probability $P_w$ (typically, $P_w$=95%). For each of the possible received levels the receiver at 605 determines a distance d(w 1/0)' between possible signal levels based upon the determined minimum and maximum thresholds. Similar operations are carried out for level X', and then for the distance between adjacent levels such as distance d(wx)' between received levels w' and x' is determined and compared at 606 with the minimum distance for each level and adjustments carried out at 607. The procedure is then repeated for the remaining levels of the constellation of symbols.

In determining the constellation, the distance between two Rx levels, such as the distance d(W 1/0)' between a symbol with LSB=0 and the same symbol with LSB=1, is set to zero, which means that no coding information could be applied on these two levels. Thus, the constellation of levels is determined. However, the network random RBS may use different ones of these levels from one RBS phase to the next.

Accordingly, the third step of our method is to determine a slicer table (step 404 of FIG. 4) in order to learn which levels are present on the RBS phase that happens to be assigned to the training sequence when the sequence is received. When the transmitting modem sends out a given level, the level at the receiving modem could be higher if the LSB=1, or lower if LSB=0, as shown in the simplified FIG. 3 which, as explained before, uses any of four training levels that can appear as any of eight received levels. Therefore, if the slicer table includes both the high level and low level, then it can work for all of the four different symbols sent during any of phases A, B, C, or D of a super frame. The slicer table for random RBS will map two received levels for each transmitted level whereas the conventional slicer table mapped one received level to one transmitted level. Random RBS may cause different symbols to be set at different levels: e.g., symbol A6 may be changed to a high level; symbol B6 may be changed to the low level; symbol C6 to the high level; and symbol D6 to low level. The slicer table is designed to have both high and low levels, and to choose the level closest to the received level as the correct value of that symbol. Thus, if the received level at the slicer input is closer to the high level, the slicer output will be the high level. If the slicer input is closer to the low level, the slicer output will be the low level. Accordingly, the total number of levels used by each slicer table is double the number of transmitting levels, but the number of levels in the transmitter constellation will be less than half of those in a transmitter constellation that is not designed to accommodate random RBS. In other words, for a network that does not have random RBS between phases, the receiver slicer table size is same as the transmitter constellation table but for random RBS, the receiver slicer table size is twice the size of the transmitter constellation table. However, the transmitter constellation table size is less than half of the non-RBS constellation table size. So the size of the RBS slicer table is still the same size as the slicer table for the non RBS case. This means that if there are 6 different symbols to be sent in a training sequence, a single slicer table capable of distinguishing between 12 levels is required regardless of which RBS phase happens to be assigned by the network when the training sequence is sent through the network. Thus, the same slicer can be used, or re-used, on any of the four RBS phases for accurate reception and detection of the training sequence.

What has been described is deemed to be illustrative of the principles of the invention. Further and other modifications will be apparent to those skilled in the art and may be made without, however, departing from the spirit and scope of the invention.

What is claimed is:

1. A method for detecting and compensating for telephone network impairment in signal transmissions between a transmitting modem and a receiving modem coupled together via a telephone network employing robbed bit signaling during super frames, comprising the steps of:
    a. repetitively transmitting a known training symbol through said network to a receiving modem;
    b. mapping said training symbol at said receiving modem to a high or to a low level value for said symbol;
    c. repeating said transmitting and mapping steps for a number of different known training symbol levels to establish a slicer table that compensates for the nature of the impairment caused by said robbed bit signaling, wherein:
        a constellation of symbol levels is determined from said repetitive transmitting of said known training symbol levels; and
        said constellation of symbol levels is determined by identifying the probability density function for each of different known training symbol level.

2. A method according to claim 1, wherein said constellation of symbol levels is determined by:
    a.) calculating a mean value of said probability density function for each of said training symbol levels;
    b.) determining a mean squared error for each level of said training symbol levels; and
    c.) establishing a distance between symbol levels based on said mean squared error at each of said levels.

3. A method for training a receiving modem connected through a telephone network to correct for differences between a transmitted and a received symbol occasioned by network impairment, comprising the steps of:
    a. repetitively receiving a known training symbol at said receiving modem;
    b. selecting between a high and a low value for said training symbol to identify said impairment; and
    c. repeating said receiving and selecting steps for a number of different known training symbol levels to determine a slicer table which compensates for said impairment, wherein said network impairment includes said network preempting a least significant bit used to encode symbol levels during different phases of network frames, said repetitive receiving of said known training symbol being continued throughout the duration of a plurality of said encoding frames.

4. A method according to claim 3, wherein said network causes a received symbol to exhibit a high level during one phase of said network frames and a low level during another phase of said network frames, said slicer table being reconfigurable for each of said phases.

5. A method according to claim 4, wherein said slicer distinguishes between the high and low level values of each of said number of different known training symbol levels received on a particular one of said phases.

6. A method for training a receiving modem connected through a telephone network to correct for differences between a transmitted and a received symbol occasioned by network impairments including robbed bit signaling which preempts a least significant bit of a customer's data depending on the frame assigned by the network for such connection, comprising the steps of:
    a. repetitively transmitting a known symbol value over said connection to ascertain when said network impairment causes said symbol to be received at said modem as a higher or lower valued symbol;

b. constructing a slicer table entry containing a higher or lower value of said symbol for said assigned frame;

c. repeating said transmitting and said constructing for a number of different known training symbol levels to complete said slicer table; and d. re-configuring said slicer table for use on another frame assigned by said network, wherein a constellation of symbol levels is determined by identifying the probability density function for each said number of different known training symbol levels.

7. A method of processing signals in a network employing robbed bit signaling, the method comprising:

(a) receiving, at a receiver of the network, a signal corresponding to a training symbol;

(b) mapping said training symbol to a first level or a second level, said first and second levels corresponding to variation in the received signal due to the robbed bit signaling;

(c) repeating steps (a) and (b) for one or more frames to determine a pattern employed in the robbed bit signaling (d) repeating steps (a), (b), and (c) for one or more other training symbols; and (e) constructing a receiver constellation table based on (i) the mapped first and second levels for the training symbols and (ii) the determined pattern, wherein constructing the receiver constellation table comprises:

receiving a sequence of training symbols, each corresponding to a transmitter level;

forming a probability density function based on the sequence; and determining the receiver constellation table based on the probability density function.

8. The invention of claim 7, further comprising determining a slicer table corresponding to said constellation table.

9. The invention of claim 7, wherein, for each transmitter level, the receiver constellation table has two levels.

10. The invention of claim 7, wherein constructing the receiver constellation table further comprises:

determining a mean value of the probability density function for each receiver level;

determining a mean square error for each said receiver level; and determining at least one of minimum and maximum thresholds for each said receiver level based on the mean square error.

11. The invention of claim 10, further comprising:

determining a distance between adjacent receiver levels based on the corresponding minimum and maximum thresholds;

comparing said distance with a threshold value; and adjusting a constellation design, if said distance is smaller than the threshold value.

12. The invention of claim 7, further comprising transmitting the training symbol using a transmitter of the network.

13. A system for processing signals in a network employing robbed bit signaling, the system comprising:

means for receiving a signal corresponding to a training symbol in a frame, wherein said means for receiving is adapted to receive a sequence of training symbols, each corresponding to a transmitter level;

means for mapping said training symbol to one of at least two levels, said levels corresponding to variation in the received signal due to the robbed bit signaling;

means for processing one or more training symbols of one or more frames to determine a pattern employed in the robbed bit signaling; and means for constructing a receiver constellation table based on (i) the mapped at least two levels for the training symbols and (ii) the determined pattern, wherein said means for constructing is adapted to:

form a probability density function based on the sequence; and determine the receiver constellation table based on the probability density function.

14. The invention of claim 13, further comprising means for transmitting the training symbol coupled to the means for receiving via the network.

* * * * *